United States Patent
Arslan et al.

(10) Patent No.: US 10,026,405 B2
(45) Date of Patent: Jul. 17, 2018

(54) METHOD FOR SPEAKER DIARIZATION

(71) Applicant: SESTEK Ses ve İletişim Bilgisayar Tekn. San. Ve Tic. A.Ş., Istanbul (TR)

(72) Inventors: Mustafa Levent Arslan, Istanbul (TR); Mustafa Erden, Istanbul (TR); Sedat Demirbağ, Istanbul (TR); Gökçe Sarar, Istanbul (TR)

(73) Assignee: SESTEK Ses velletisim Bilgisayar Tekn. San. Ve Tic A.S., Istanbul (TR)

( * ) Notice: Subject to any disclaimer, the term of this patent is extended or adjusted under 35 U.S.C. 154(b) by 38 days.

(21) Appl. No.: 15/145,771

(22) Filed: May 3, 2016

(65) Prior Publication Data

US 2017/0323643 A1   Nov. 9, 2017

(51) Int. Cl.
| | | |
|---|---|---|
| G10L 17/08 | (2013.01) | |
| G10L 19/018 | (2013.01) | |
| G10L 25/24 | (2013.01) | |
| G10L 17/00 | (2013.01) | |
| G10L 19/038 | (2013.01) | |
| G10L 19/00 | (2013.01) | |

(52) U.S. Cl.
CPC ............ *G10L 17/005* (2013.01); *G10L 17/08* (2013.01); *G10L 19/018* (2013.01); *G10L 19/038* (2013.01); *G10L 25/24* (2013.01); *G10L 2019/0005* (2013.01)

(58) Field of Classification Search
CPC ..... G10L 17/005; G10L 17/08; G10L 19/018; G10L 25/24
USPC ......................................................... 704/246
See application file for complete search history.

(56) References Cited

U.S. PATENT DOCUMENTS

| | | |
|---|---|---|
| 5,598,507 A | 1/1997 | Kimber et al. |
| 7,930,179 B1 | 4/2011 | Gorin et al. |
| 8,433,567 B2 | 4/2013 | Aronowitz |
| 2004/0143434 A1 | 7/2004 | Divakaran |
| 2006/0251261 A1* | 11/2006 | Christoph ............... H03G 3/32 381/1 |
| 2007/0067163 A1* | 3/2007 | Kabal .................. G10L 21/038 704/207 |
| 2011/0251843 A1 | 10/2011 | Aronowitz |
| 2012/0253811 A1 | 10/2012 | Breslin et al. |
| 2013/0006635 A1 | 1/2013 | Aronowitz |
| 2014/0180673 A1* | 6/2014 | Neuhauser ........... G10L 19/018 704/9 |
| 2015/0025887 A1* | 1/2015 | Sidi ........................ G10L 17/02 704/245 |
| 2016/0283185 A1* | 9/2016 | McLaren ................ G06F 3/165 |

* cited by examiner

*Primary Examiner* — Richemond Dorvil
*Assistant Examiner* — Rodrigo Chavez
(74) *Attorney, Agent, or Firm* — Gokalp Bayramoglu

(57) ABSTRACT

Disclosed is a speaker diarization process for determining which speaker is speaking at what time during the course of a conversation. The entire process can be most easily described in five main parts: Segmentation where speech/non-speech decisions are made; frame feature extraction where useful information is obtained from the frames; segment modeling where the information from the frame feature extraction is combined with segment start and end time information to create segment specific features; speaker decisions when the segments are clustered to create speaker models; and corrections where frame level corrections are applied to the information extracted.

10 Claims, 6 Drawing Sheets

METHOD FOR SPEAKER DIARIZATION

FIELD OF THE INVENTION

The present invention relates to the field of audio analysis in general, and in particular to a method of Speaker Diarization whereby the identity of speakers and the who question of "who spoke and when?" are answered.

BACKGROUND OF THE INVENTION

Large organizations, such as commercial organizations, financial organizations or public safety organizations conduct numerous interactions with customers, users, suppliers or other persons on a daily basis. Many of these interactions are vocal, or at least comprise a vocal component, such as an audio part of a video or face-to-face interaction. A significant part of these interactions takes place between a customer and a representative of the organization such as an agent. Many of the interactions are captured and often recorded.

The interactions convey large volumes of data, which may be of high significance to the organization. However, this data is not structured and therefore not easily accessible. Therefore, in order to get insight into the data conveyed by the interactions, audio analysis techniques need to be applied at the audio in order to extract the information The interactions and their content can be used for a multiplicity of purposes. One such purpose relates to quality monitoring for assessing the quality of the agent handling the interaction or another entity associated with the call center such as a product, the organization, or the like. Another usage of the interactions relates to analyzing the customer experience, whether the customer is happy with the product or service, threatening to leave, mentioned competitor names, or the like. Automated systems activate multiple tools as part of the analysis. Such tools may include voice recognition tools such as automatic speech recognition or word spotting, emotion analysis tools, call flow analysis, including for example interaction duration, hold time, number of transfers or the like. Different tools may be required for different analyses.

The sides of the interaction, e.g. the agent and the customer may be recorded separately, i.e., on two separate audio signals, in which case it may be known in advance which signal represents the agent and which one represents the customer. In other cases the interactions may be recorded as summed, i.e., the two sides are recorded on one audio signal.

Some of the audio analysis tools are highly dependent on being activated on a single speaker signal. For example, activating an emotion detection tool on a summed audio signal is likely to provide erroneous results. Therefore, in order to activate these tools on summed audio it is required to separate the signal into two signals, each containing speech segments spoken by a single speaker only. Separated signals may contain non-continuous segments of the original interaction, due to speech of the other side, double talk, or the like.

In some embodiments, different analyses may be more relevant to one side of the interaction than to the other. For example, it may be more important to detect emotion on one speech signal than another. For example in the case of a recorded conference call between four or five parties verifying that certain buzzwords had been said may be a part of quality assurance which is relevant to a sales agents' side.

Therefore, in such situations and when the audio is summed, in addition to separating the audio into two or more signals, it is also required to identify which signal represents which speaker, in order to activate relevant analysis tools for each speaker.

There is thus a need for a method for speaker source identification, which will segment a summed audio signal into separate signals if required, and answer the question of who is speaking and when.

Speaker Diarization is the process of partitioning an input audio stream into homogeneous segments according to the speaker identity. It can enhance the readability of an automatic speech transcription by structuring the audio stream into speaker turns and, when used together with speaker recognition systems, by providing the speaker's true identity.

Knowing when each speaker is talking in an audio or video recording can be useful in and of itself, but it is also an important processing step in many tasks. For example, in the field of rich transcription, speaker diarization is used both as a stand-alone application that attributes speaker regions to an audio or video file and as a preprocessing step for speech recognition. Using diarization for speech recognition enables speaker-attributed speech-to-text and can be used as the basis for different modes of adaptation, e.g., vocal tract length normalization (VTLN) and speaker-model adaptation. This task has therefore become central in the speech-research community.

In speaker diarization one of the most popular methods is to use a Gaussian mixture model to model each of the speakers, and assign the corresponding frames for each speaker with the help of a Hidden Markov Model. There are two main kinds of clustering scenario. The first one is by far the most popular and is called Bottom-Up. The algorithm starts in splitting the full audio content in a succession of clusters and progessively tries to merge the redundant clusters in order to reach a situation where each cluster corresponds to a real speaker. The second clustering strategy is called top-down and starts with one single cluster for all the audio data and tries to split it iteratively until reaching a number of clusters equal to the number of speakers.

Short-time spectral features are also frequently employed where short-term and long-term features are fused. Additionally, merging jitter and shimmer with prosodic and spectral features can be done to achieve a 20% relative diarization error rate (DER).

Current diarization systems choose different alternatives for detection of initial segment boundaries. "Compensation of Intra-speaker Variability in Speaker Diarization" as disclosed in US2011251843/U.S. Pat. No. 8,433,567 selects a fixed section length whereas "Unsupervised Speaker Segmentation of Multi-speaker Speech Data" as disclosed in U.S. Pat. No. 7,930,179 utilizes Bayesian information criterion (BIC) for detection of speaker changes. However, BIC is found to be inefficient for detection of short speaker terms which have durations less than 2-5 seconds.

For example "Unsupervised Speaker Segmentation of Multi-Speaker Speech Data" as disclosed in U.S. Pat. No. 7,930,179 and "Method of Speaker Clustering for Unknown Speakers in Conversational Audio Data" as disclosed in U.S. Pat. No. 5,598,507 both utilize bottom-up approach. When features or information about expected speakers are accessible, diarization problem becomes a speaker identification task. In US2013006635 "Method and System for Speaker Diarization" pre trained acoustic models are assumed to be accessible. US20120253811 "Speech Processing System and Method" compares segment parameters with stored speaker profiles.

Some of the previous methods are focused, on specific domains. "Blind Diarization of Recorded Calls with Arbitrary Number of Speakers" as disclosed in US2015025887 focuses on calls and "Audio-Assisted Segmentation and Browsing of News Videos" as disclosed in US2004143434 focuses on broadcast news.

Existing diarization systems do not take into account the prosodic parameters such as pitch, energy, and durations. Prosodic parameters contain information about speaker changes as well as speaker related parameters for clustering. Furthermore, previous diarization systems employ top-down or bottom up clustering approaches that require GMM estimations for all clusters in all steps. This calculations increase processing times and hardware requirements therefore causing inefficiencies in the systems they are used.

SUMMARY OF THE INVENTION

This invention discloses a method for speaker diarization. The method divides an audio signal into multiple parts depending on different speakers in an audio signal.

An object of the invention is to provide a speaker diarization method to reduce the processing time and hardware requirements therefore increasing the system efficiency by breaking down signals into their smaller parts and using segmentation, frame feature extraction, segment modeling, speaker decisions, and corrections to answering the question of who spoke and when.

Another object of the invention is to provide a fast, robust, unsupervised and domain independent speaker diarization method that estimates Vector Quantization (VQ) over all audio data. Using this Vector Quantization, Euclidean distances between MFCC's and codewords are calculated. Frames are labeled with related codeword ID's and segments' PMF's are obtained over contained codeword ID distributions. Features extracted from STT module is integrated with prosodic and spectral parameters for step-by-step composition of speaker segments. This results in a system that is computationally less intensive.

The proposed method can be implemented on a computer with an input unit, output unit, a storage unit, and a computational unit. The algorithms used in the computer system aim to achieve an improved diarization performance in computationally efficient way. In order to meet the requirement for biometric representation, simple probability distributions are used. Model comparisons and updates are done through the probability distributions, avoiding the need for complicated computer operations.

Another object of the invention is to provide a speaker diarization method for increasing system efficiency by using a clustering algorithm. Instead of top-down or bottom-up approaches step-by-step clustering is applied. For this algorithm speakers are determined by segments that are closest to each other and furthest to other speakers.

Another object of the invention is to provide a speaker diarization method that increases system efficiency by using prosodic parameters: prosodic parameters are employed in several stages of diarization such as selection of speaker segments, feature extraction and speaker change detection.

Another object of the invention is to provide a speaker diarization method that increases the system's efficiency by using codeword ID histograms: representation of segments with probability mass function (PMF) derived from distributions of codeword IDs over frames.

Another object of the invention is to provide a speaker diarization method that increases system efficiency STT based features: STT module outputs are utilized as features for diarization. All the information derived from STT is collected such as words, word boundaries and confidences.

Another object of the invention is to provide a speaker diarization method that requires no prior knowledge about speakers before processing of recording in an unsupervised manner.

Another object of the invention is to provide a speaker diarization method that increases system efficiency by overlap detection: segments close to multiple speakers are labeled as overlap and subsequent steps are realized accordingly. Improved speech non-speech detection with STT and prosody based parameters including word confidences, pitch values.

Another object of the invention is to provide a speaker diarization method that works for all types of audio data including but not limited to conversational speech, broadcast news and meeting recordings.

These and other objectives, features, and advantages of the present invention will become apparent from the following detailed description, the accompanying drawings, and the appended claims.

BRIEF DESCRIPTION OF THE DRAWINGS

The present invention will be apparent to those skilled in the art by reading the following description which reference to the attached drawings. Unless indicated otherwise, the drawings provide exemplary embodiments or aspects of the disclosure and do not limit the scope of the disclosure. In the drawings provided.

DETAILED DESCRIPTION

Figure 1:
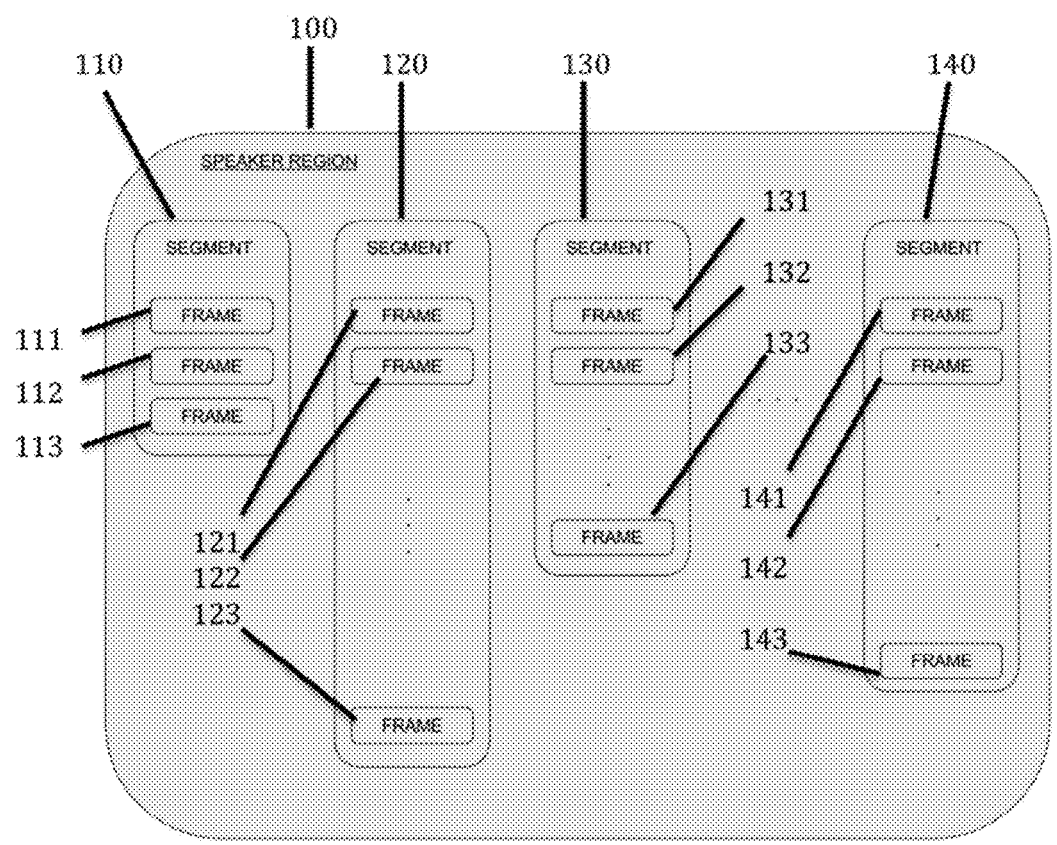
FIG. 1 illustrates the basic structure of the main corresponding structural portions of speaker diarization.

With reference to the drawings and in particular FIG. 1, FIG. 1 illustrates the basic structure of the main corresponding structural portions of speaker diarization. The speaker region 100 is a portion of an audio signal or an audio part, belonging to a specific speaker containing a plurality of various segments 110, 120, 130, 140. The segments themselves are any part of the audio signal within the speaker region where there is non-silence. There can be any number of segments in a speaker region and the illustration of only four segments is not meant to limit the disclosure in any way. Within each segment, there are a plurality of equal sized frames (111, 112, 113, 121, 122, 123, 131, 132, 133, 141, 142, 143) each frame is a narrow, fixed size audio part that is fixed in either duration. As with the segments 110, 120, 130, 140; the number of frames shown in each segment are three, but are not meant to limit the disclosure in any way. The number of frames or segments can be adjusted based on the implementation of the method to different data.

Figure 2:
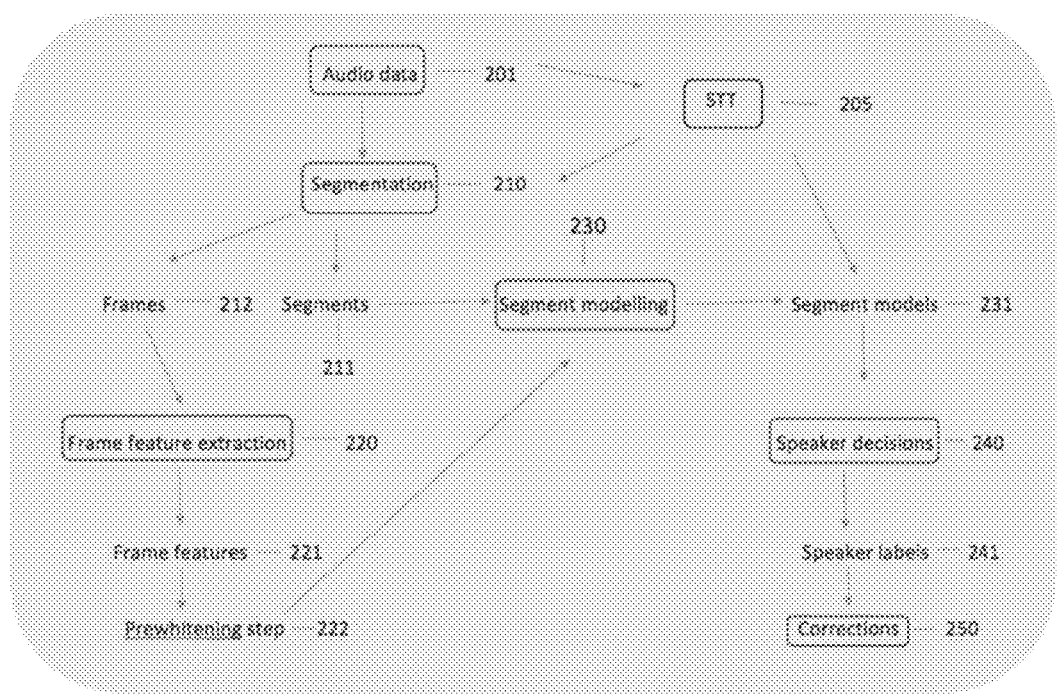
FIG. 2 is a flowchart of the main steps involved in the method of speaker diarization.

FIG. 2 shows a flowchart of the main steps involved in the method of speaker diarization. Audio data 201 is received and then segmentation 210 is performed, followed by frame feature extraction 220. The segmentation process divides the audio data 201 into portions of speech and non-speech including speech segments 211 as described in FIG. 1 above and into further fragmented frames (212) (111, 112, 113, 121, 122, 123, 131, 132, 133, 141, 142, 143). In other words, the segmentation is used as the decision mechanism for silence/non-silence regions of an audio signal or conversation. The determination of silence or non-silence depends on the energy changes of audio during speech transitions. A dynamically determined threshold allows for non-speech portions to be labeled as silence during the segmentation process. The energy threshold obtained is based dynamically on the audio data. First energy levels are sorted, and then the threshold is set as the minimum speech energy based on the $20^{th}$ percentile of the sorted energy values. The speech sections are then split into equal length frames with overlapping between the frames such that the start of one segment overlaps with either the previous segment, the subsequent segment, or both.

Also, speech to text "STT" module (205) is performed on the audio stream and used in segmentation and segment modeling. Features extracted from STT module (205) is integrated with prosodic and spectral parameters for step-by-step composition of speaker segments. STT module outputs are utilized as features for diarization. All the information derived from STT is collected such as words, word boundaries and confidences.

Frame feature extraction 220 is then used to extract important information from the frames, which is generally labeled as frame features 221. Such information can include start and end time or the Mel Frequency Cepstral Cofficients (MFCC), logarithmic energies, fundamental frequencies, and implemented Vector Quantization (VQ). For decorrelation and uniform separation of the feature dimensions, a pre-whitening step is utilized as follows:

$$X_w = \Sigma^{-1/2}(x - \mu_x)$$

Where x is the feature vector, $\mu_x$ and $\Sigma$ are the mean vector and full covariance matrices of x, respectively, and $x_w$ is the whitened feature vector.

Then, using these transformed feature vectors, vector quantization is applied, and a codebook is generated as a model. This model is used as a background model of the current audio, containing information from the whole conversation. The codebook size is determined as proportional to the speech duration. For example, a size of 128 can be selected for a three-minute audio. Then, for every frame, Euclidean distances between MFCC vectors and codewords are calculated. Each frame is labeled with the index of the codeword that resulted in the closest distance. The Euclidean distance d is calculated as follows for two vectors $V_1$ and $V_2$:

$$d = \sqrt{\sum_{i=1}^{N}(V_1(i) - V_2(i))^2}$$

Where N is the vector size

Another feature extracted is pitch information. Extracting pitch information (physically, fundamental frequencies) is known in the field of the art. Therefore, fundamental frequencies are calculated and kept for each frame for further processing.

In segment modeling 230, the information extracted from the frames (frame features (221) and pre-whitening step (222)) is combined with information that are segment specific and clustered together into segment models 231. The following example is offered for clarity regarding segment modeling 230 but is not meant to limit the scope of the disclosure: if each segment contains simple label populations such as: segment 1→[3 5 65 4 89 . . . 78 121 4] and segment 2 [8 8 53 100 . . . 44 9] then these populations are transformed into characteristic representations for every segment. These representations are PMFs (Probability Mass Functions). Generating a PMF involves counting the occurrences of each label, and dividing these counts by the total label count. Label populations can be used to represent speaker characteristics. Thus PMFs can be used as a basis for modeling and comparisons for each segment. Also, energy weighted fundamental frequency variance calculation (described below 440) are done for each segment. Therefore, a person can achieve segment modeling via transforming a label population into PMF, and calculating energy weighted fundamental frequency variance as explained in the equations of 440 below.

Once the segment models 231 have been created, they are used in making a speaker decision 240 as to who is speaking, and what they are saying. The speaker decisions generally are made by comparing models via a distance metric and combining similar models and is known in the art. Specifically, a unique method in this disclosure, involves assigning priority among segments according to their lengths and fundamental frequency variances. The priority is originally given to longer duration segments since those segments will provide more information about the speaker. A lower fundamental frequency variance will give a lower probability of having multiple speakers within a segment. Then according to the selection priority order, a segment pool is made and comparisons are made among the PMFs of the segments. The closest segments are merged and for the next speaker, used segments (i.e. those segments that have already been assigned a speaker) are discarded.

Once the speaker is determined, speaker labels 241 are assigned to the segments and a correction is performed. Corrections 250 are done on a frame-by-frame basis to ensure that some frames have not been erroneously given a speaker label 241 that does not match the speaker. Details describing the corrections 250 are below. One way of accomplishing such a correction is to check one frame to see if other frames immediately adjacent to the said frame have inconsistent speaker labels 241.

Figure 3:
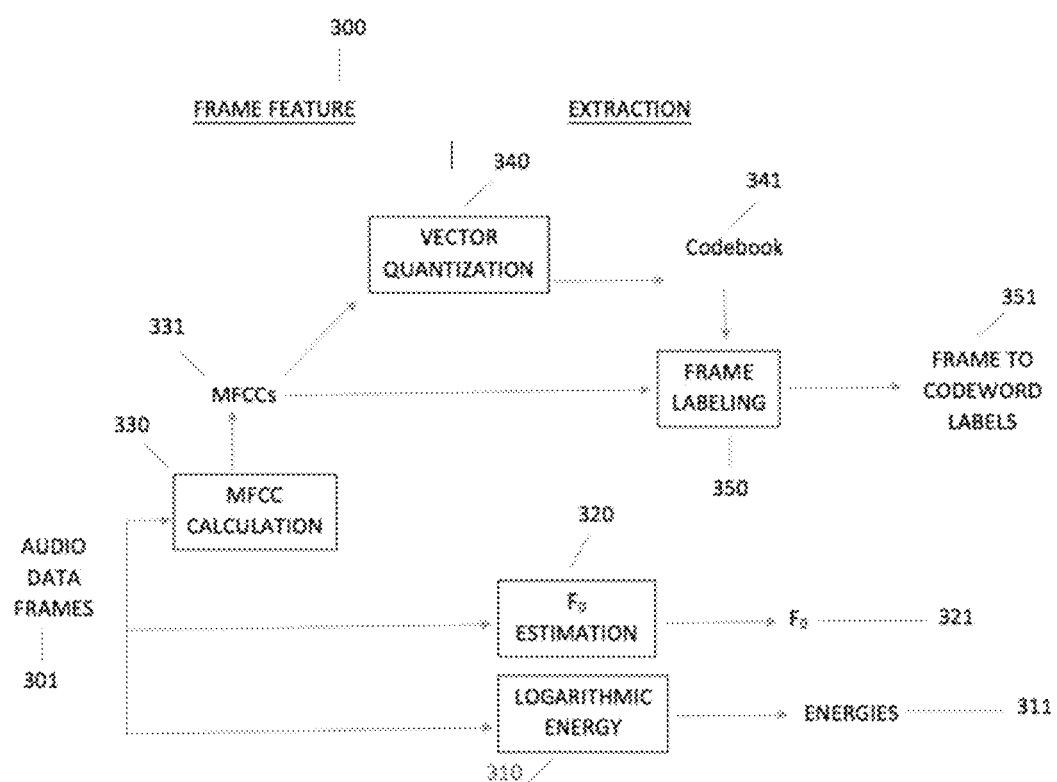
FIG. 3 illustrates the frame feature extraction process.

FIG. 3 shows a flowchart of the frame feature extraction. As part of the splitting of the streams detailed in FIG. 1, each frame is divided into equal length frames. Once the frames come in, Mel Frequency Cepstral Coefficients (MFCC) 331 are calculated from the frames using an MFCC calculation 330 which is well known in the art. The mel frequency cepstral coefficients (MFCC) are part of feature vectors, and using the MFCC's a vector quantization (340) is completed. Both Vector Quantization and mel frequency cepstral coefficients are known in the field. Vector Quantization is used to create codebook (341). Codebook size is determined using the frame count and feature vector dimensions. Once the codebook (341) is estimated, it is used as a background model of the audio stream that contains information for the entire conversation. Then for every frame, Euclidean distances between frame MFCC and codewords are calculated for frame labeling (350). These codewords are then used for labeling corresponding frames with frame to codeword labels 351. Another feature that is extracted during frame feature extraction 300 is pitch information. Extracting pitch information (physically, fundamental frequencies) is known in the field of the art. Thus, fundamental frequencies ($f_0$) (321) are calculated and kept for each frame by $f_0$ estimation (320) for further processing in segment modeling. Actual frame energies (311) are also utilized by calculating the energy using logarithmic energy (310) with the following formula:

$$le(i) = \log(1 + e(i))$$

where e is the energy and le is log of energy.

Figure 4:
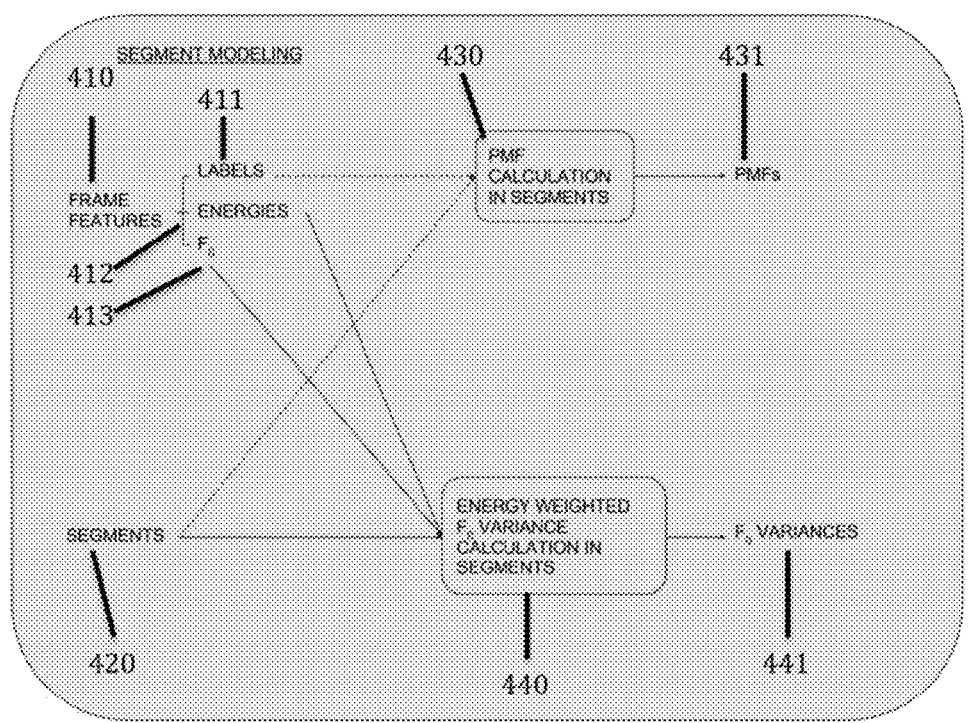
FIG. 4 illustrates the segment modeling step.

FIG. 4 shows the segment modeling 230 process. Segment modeling 230 combines segment start-end time information with the frame features (410) extracted during the frame feature extraction. Labels (411), Energies (412) and $f_0$ (413) as well as the segments (420) are taken and combined so that key representation of segments can be created. Within each segment, corresponding frame labels (411) are gathered and used to generate a codeword ID histogram for each segment. PMFs are created as a result of a normalizing histogram such that the sum of bin values would give 1. Since the labels (411) are gathered using mel frequency cepstral coefficients (MFCC); it logically follows and is expected that the labels (411) contain both biometric and phonetic features of speech within the labels (411).

Incoming frame features (410) also contain fundamental frequencies $f_0$ (413) and energy information (412). Using this information an energy weighted $f_0$ variance (441) can be calculated using an energy weighted $f_0$ variance calculation (440) within each segment using frames that are within the boundaries of each segment. The weighted mean and variances in (440) are calculated using the following formulas:

$$\mu_{f_0} = \frac{\sum_{i}^{N} le(i) f_0(i)}{\sum_{i}^{N} le(i)} \text{ and } \sigma_{f_0}^2 = \frac{\sum_{i}^{N} le(i)(f_0(i) - \mu_{f_0})^2}{\sum_{i}^{N} le(i)}$$

where N is the number of total frames within current segment. le and $f_0$ are log energy and fundamental frequency of the frame respectively. $\mu_{f_0}$ and $\sigma_{f_0}^2$ are resulting energy weighted mean and variance of the segment $f_0$ values. FIG. 4 shows segment modeling process.

After segmentation, frame feature extraction, and segment modeling, speaker decisions (as seen as 240 in FIG. 2) are made. All segments own their speaker ids after this stage. Up to this level, a PMF and a $\sigma_{f_0}^2$ value is assigned to each segment. PMF values are used for modeling the segments. Segment lengths and $\sigma_{f_0}^2$ are used for the selection priority among segments. Regarding segment priority, segments are ordered for use in speaker assignment.

As a starting point it is desired to have reliable models. Segments having longer duration and lower $\sigma_{f_0}^2$ are given priority in selection. Segments with longer duration will contain phonetically more balanced speech and better represent biometric features. However, longer duration brings the possibility of having more than one speaker in that segment. To compensate for the possibility of multiple speakers, $\sigma_{f_0}^2$ is used as an additional data point. If speakers have distinct pitch characteristics, $\sigma_{f_0}^2$ can be used for identifying segments that may represent two separate speakers. Also noise and background discussions in segments may cause unexpected $f_0$ calculations. To suppress the effect of noisy parts, $\sigma_{f_0}^2$ are calculated as energy weighted. Additionally, a threshold is determined for the voiced frame ratio in a segment that is tuned experimentally. In other words, if a segment contains mostly frames without a fundamental frequency, the frame may contain only small amounts of unwanted audio. If this audio has a stable pitch behavior it may bias the speaker selection and lead to a incorrect identification of the speaker, thus segments with non-zero $f_0$ ratio below the threshold are discarded and assigned the lowest priority. A normalization is applied on lengths and $\sigma_{f_0}^2$ of all segments, and mapped into a [0 1] range. The normalization formula is below.

$$\hat{l}_i = \frac{l_i - l_{min}}{l_{max} - l_{min}}, i = 1, 2, \ldots, S$$

Where S is the number of segments, $l_i$ is the length, and $\hat{l}_i$ is the normalized length of the $i^{th}$ segment. Likewise, the normalization is also applied on $\sigma_{f_0}^2$ values.

Weights (0.5, −0.5) are given for both lengths and variances. With both parameters and their corresponding weights, a total priority score is calculated for each segment using the equation below:

$$s_p^i = 0.5 \hat{l}_i - 0.5 \hat{\sigma}_{f_0}^2{}_i, i = 1, 2, \ldots, S$$

Where $s_p^i$ denotes the $i^{th}$ segment priority score. Segments are then sorted according to these priorities and the top portion of these are separated for the initial speaker decisions.

Therefore, both parameters and their corresponding weights, are used to calculate a total priority weight for each segment. Segments are sorted according to these priorities and a top portion of them are separated for initial speaker decisions. In other words, the information is sorted such that the highest prioritized segments have the highest probability of correctly identifying a speaker.

Speaker assignments are then given to each segment to determine who is speaking in each segment. Speaker assignments are done using segment similarities such that segments forming a speaker should be similar to other segments of that speaker and dissimilar to segments of other speakers. During the processing all the values about segments are stored in memory, and are used in make comparisons on PMFs of segments. PMF similarities are one criterion that is considered in determining similarity. The $L_1$ distance is used as the distance metric, which is as follows, for two PMFs $P^j$ and $P^k$:

$$d_{j,k} = \sum_{i=1}^{M} |P_i^j - P_i^k|$$

The lower distance two segments have, the more similar they are.

Speaker initializations are done for each of the speakers. For each speaker initialization, a certain number of segments are chosen that have the highest similarity. This similarity measure is calculated as the difference between intra-similarity and inter-similarity. Intra-similarity is the comparison of new speaker candidate segments with other non-assigned new speaker candidate segments and inter-similarity is the comparison between new candidate segments and segments of already determined speakers. Positive decisions are made towards higher intra, lower inter similarities, and these segments are used for a new speaker creation. When intra-similarity is high and inter-similarity is low, it indicates that the speaker in these segments is a new speaker and results in the initialization of a new speaker label. After initialization of all speakers, any remaining unassigned segments are processed. For each of them, the similarity to all speakers is calculated and the segment is then assigned a speaker label whose other segments most closely match the unassigned segment. This assignment continues until all segments are assigned a speaker label. Segment similarities are calculated using PMF similarities since the segments are represented with PMF values. The sum of absolute differences is used as the a measure of distance between segments. After every speaker decision, present PMFs are updated with new segment PMFs. This update operation is a segment length weighted sum of PMFs, resulting in a new PMF. Updates are done as the element-wise summation between two PMFs with a weight coming from segment lengths. It can be expressed as follows for $i^{th}$ element in update of PMFs $P_1$ with $P_2$, resulting in $P_3$:

$$P_3(i) = \frac{P_1(i)l_1 + P_2(i)l_2}{l_1 + l_2}, i \in 1, 2, \ldots, M$$

where M is total element count for a PMF; $l_1$ and $l_2$ are the lengths of the segments.

Therefore updating the PMF's of segments is done in order to give more emphasis to longer segments. Thus the process for assigning a speaker label (i.e. speaker assignment) involves the input of segments and an output of a speaker label and the following steps: 1) finding segments that are most similar to each other and no other existing label, 2) creating a new speaker model 3) repeating steps 1 and 2 above until all speakers have been initialized 4) then for any unassigned segments comparing the segment with speaker models, and assigning the closest speaker to that segment 5) updating the model with new values for the segments 6) ensuring no other speaker labels need to be created.

No process can be perfect, and to compensate for possible errors, a correction phase is included in the method. The aim is mainly to find and split speaker segments that Each segment may contain speaker labels for multiple speakers. During speaker corrections, the algorithm returns back to doing a frame level processing. Each frame was previously assigned labels based on closest codeword IDs. A search is made of every frame using speaker PMF to identify which speakers is most likely associated with each frame, and the frames are accordingly given speaker labels for each frame. In order to find incorrectly labeled frames, the neighboring frames are checked to see if one speaker label has been assigned repeatedly to successive neighboring frames. For a frame k, the k-N and k+N neighbors are gathered and the speaker label with the highest count is assigned to the tested frame. Using this correction technique, erroneous label fluctuations can be smoothed out. In order to find out possible speaker changes inside segments, a resegmentation algorithm is applied using speaker labels on the frames. This algorithm shifts an inspection window over frames looking for a group of another speaker's labels.

The algorithm determines the percentage of frames for each speaker within the window. It picks the speaker with highest percentage to be the correct speaker label. If the picked speaker and segment speaker have a $f_0$ difference larger than a threshold, a further comparison is made. $f_0$ of the new candidate part is compared with the number of speaker labels assigned to the frames in a segment (i.e. if labels A B and C were assigned within a segment, the frame would be compared to all three candidate labels). After comparison, a score is given. Also for the frame count percentage, a score is given. These two scores are combined with their corresponding weights. If the resulting score is above a predetermined threshold, a decision for speaker change is made.

Figure 5:
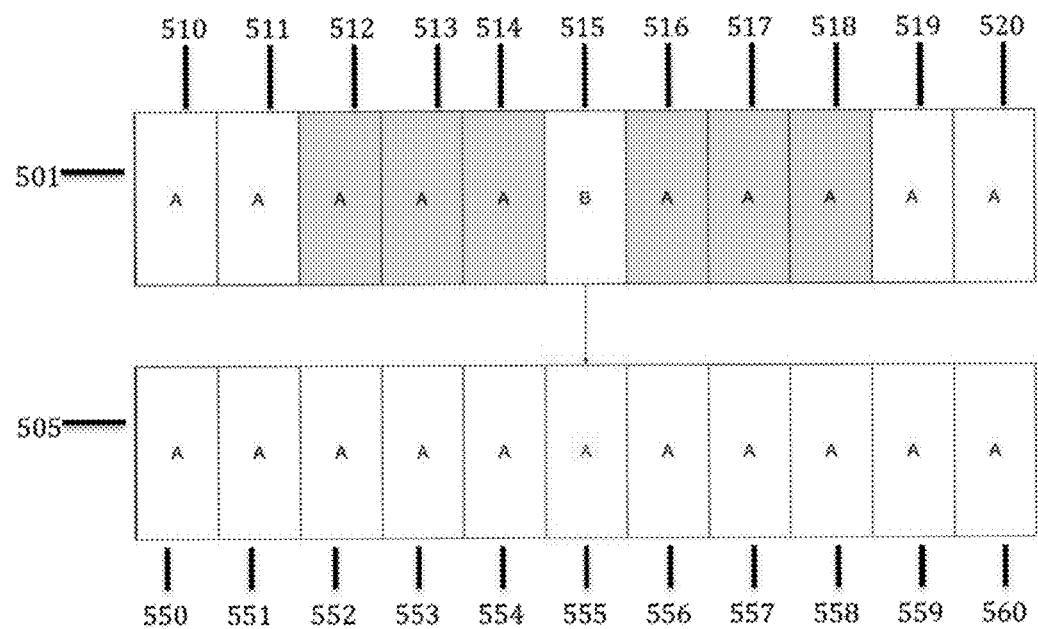
FIG. 5 illustrates frame label corrections regarding successive 3 neighbor frames.

FIG. 5 illustrates the correction process showing a portion of a segment before correction (501) and a portion of the same segment after correction (505) using the method of correcting explained above. In FIG. 5, frame k is shown as 515 and the N value has been set to 3. Therefore the correction looks to the three most adjacent frames on either side of frame k (515) which are preceding frames (512, 513, and 514) following frames (516, 517 and 518). 512, 513, 514, 516, 517, and 518 are highlighted to help show where the k-N and k+N range falls. Looking at the k+3 and k-3 frames, the system determines that speaker label "A" outnumbers speaker label "B" 6 to 1. Based on the fact that the majority is used to determine the most likely correct speaker label, frame 515 becomes frame 555 and is relabeled as "A" in the corrected stream 505, all other frames 550 through 560 remain unchanged in this illustrated example.

Figure 6:
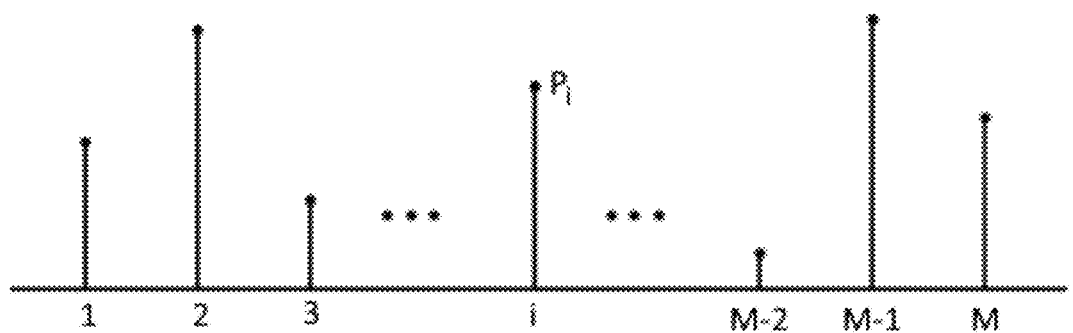
FIG. 6 illustrates a sample PMF calculation.

FIG. 6 illustrates a sample PMF calculation. Pi shows the probability for value i. It is generated from M bins. In this case, M is equal to the codebook size (number of codewords within the codebook). Namely, such a segment PMF contains information from i'th codeword with probability Pi.

The invention claimed is:

1. A method for speaker diarization, implemented on a computer system, controlling the computer system to perform the following steps:

acquiring an audio data;

segmenting the audio data into a plurality of segments;

segmenting the plurality of segments into a plurality of frames with overlapping between the plurality of frames;

extracting information from the frames and labeling the frames with a plurality of frame features, wherein the frame features include at least one prosodic parameter and at least one spectral parameter;

extracting duration of the frames, and a plurality of fundamental frequencies of the frames;

prewhitening the frame features;

wherein the prewhitening of the frame features is performed as follows $$x_w = \Sigma^{-\frac{1}{2}}(x - \mu_x)$$

where x is a feature vector, $\mu_x$ and $\Sigma$ are mean vector and full covariance matrices of x, respectively, and $x_w$ is a whitened feature vector;

applying vector quantization to the whitened feature vector and generating a codebook as a background model of the audio data;

extracting pitch information from the frames;

generating a plurality of probability mass functions for the plurality of segments wherein generating each probability mass function includes counting occurrences of each label, and dividing a count of the each label by a total label count;

calculating energy weighted fundamental frequency variance for each segment;

generating a plurality of segment models by combining the pitch information, the duration of the frames, the plurality of fundamental frequencies of the frames, the background models and the plurality of probability mass functions;

determining a plurality of speaker decisions to decide a speaker for each segment based on the plurality of segment models;

wherein during the step of determining a plurality of speaker decisions, segments having longer durations and lower fundamental frequency difference are given priority in assigning the speaker decisions;

wherein a lower fundamental frequency variance within a segment shows a lower probability of having multiple speakers within the segment;

determining speakers for the plurality of segments and assigning speaker labels to the plurality of segments; and comparing adjacent frames and generating a score based on the comparison and correcting the speaker labels based on the score being above a predetermined threshold.

2. The method according to claim 1,
wherein after determining the speaker decisions, a plurality of speaker labels are attached to the segments.

3. The method according to claim 1,
wherein after determining the speaker decisions, a plurality of speaker labels are attached to the frames.

4. The method according to claim 3,
wherein during the extracting of information from the frames, mel frequency cepstral coefficients calculations are used to calculate a plurality of mel frequency cepstral coefficients;
wherein the mel frequency cepstral coefficients are used in vector quantization to determine the codebook and a plurality of codewords;
wherein euclidean distances are calculated between mel frequency cepstral coefficients and codewords;
wherein each frame is labeled with the index of the codeword that resulted.

5. The method according to claim 1,
wherein during the step of determining a plurality of speaker decisions, the segment models are compared using a distance metric.

6. The method according to claim 1,
wherein during the step of determining the plurality of speaker decisions, the segment models are compared using a distance metric;
wherein a priority is assigned to the segments and a segment pool is made and comparisons are made among the probability mass functions.

7. The method according to claim 2,
wherein the segment labels contain both biometric and phonetic features of speech.

8. The method according to claim 3,
wherein the frame labels contain both biometric and phonetic features of speech.

9. The method according to claim 1,
wherein during the step of determining a plurality of speaker decisions, a normalization is applied on to the segments.

10. The method according to claim 3,
wherein during the step of correcting the speaker labels of the segments, an inspection window is shifted over adjacent frames looking for a speaker label that is inconsistent with neighboring frames;
wherein when an inconsistent label is found, the inconsistent label is changed to match the speaker label of the highest percentage of labels within the inspection window.

* * * * *